United States Patent
Xu et al.

(10) Patent No.: US 10,641,144 B2
(45) Date of Patent: May 5, 2020

(54) INTAKE MANIFOLD DRAIN ASSEMBLY OF AN ENGINE

(71) Applicant: Ford Global Technologies LLC, Dearborn, MI (US)

(72) Inventors: Xihu Xu, Nanjing (CN); Frank Valencia, Lansing, MI (US); Kevin V. Tallio, Saline, MI (US)

(73) Assignee: Ford Global Technologies LLC, Dearborn, MI (US)

( * ) Notice: Subject to any disclaimer, the term of this patent is extended or adjusted under 35 U.S.C. 154(b) by 0 days.

(21) Appl. No.: 16/250,001

(22) Filed: Jan. 17, 2019

(65) Prior Publication Data

US 2019/0226369 A1    Jul. 25, 2019

(30) Foreign Application Priority Data

Jan. 24, 2018  (CN) .......................... 2018 1 0067486

(51) Int. Cl.
| | |
|---|---|
| *F01M 13/04* | (2006.01) |
| *F02M 35/10* | (2006.01) |
| *F02B 29/04* | (2006.01) |
| *F01M 13/00* | (2006.01) |

(52) U.S. Cl.
CPC ........ *F01M 13/04* (2013.01); *F01M 13/0011* (2013.01); *F02B 29/0437* (2013.01); *F02B 29/0468* (2013.01); *F02M 35/10209* (2013.01); *F02M 35/10222* (2013.01); *F01M 2013/0044* (2013.01)

(58) Field of Classification Search
CPC ........... F01M 13/04; F01M 2013/0044; F01M 13/0011; F01M 2013/0094; F01M 2013/0477; F01M 2013/0494; F01M 2013/0437; F02B 29/0468; F02M 35/10209; F02M 35/10222
See application file for complete search history.

(56) References Cited

U.S. PATENT DOCUMENTS

| | | | |
|---|---|---|---|
| 8,371,119 B2 | 2/2013 | Durand et al. | |
| 9,181,853 B2 | 11/2015 | Leone et al. | |
| 9,470,190 B2 | 10/2016 | Newman et al. | |
| 2014/0158096 A1* | 6/2014 | Leone | F01M 13/028 123/563 |
| 2017/0204819 A1* | 7/2017 | Amamoto | F02M 35/10091 |
| 2019/0032611 A1* | 1/2019 | Kim | F01M 13/00 |

FOREIGN PATENT DOCUMENTS

CN          203347958 U    12/2013

\* cited by examiner

*Primary Examiner* — Jacob M Amick
(74) *Attorney, Agent, or Firm* — Geoffrey Brumbaugh; Kolitch Romano LLP

(57) ABSTRACT

An intake manifold drain assembly of an engine comprises a drain tube connected to a bottom of a manifold chamber; an oil separator connected to an engine block; and a controlled check valve connecting the drain tube to the oil separator and configured to allow liquid and gas in the manifold chamber to flow into the oil separator and control a gas flow passing the controlled check valve below a threshold flowrate.

20 Claims, 6 Drawing Sheets

INTAKE MANIFOLD DRAIN ASSEMBLY OF AN ENGINE

RELATED APPLICATION

This application claims the benefit of Chinese Patent Application No.: CN 201810067486.9 filed on Jan. 24, 2018, the entire contents thereof being incorporated herein by reference.

FIELD

The present disclosure relates to an intake manifold drain assembly in an intake system of an engine, specifically relates to an intake manifold drain system to drain oil in an intake manifold drain assembly at a controlled flowrate.

BACKGROUND

Some internal combustion engines include a positive crankcase ventilation (PCV) system to route gas (i.e., PCV gas) in a crankcase to an intake manifold of the engines. Some engines further include a water-cooled charge air cooler (WCAC) positioned in an intake manifold. The WCAC'sfins and plate can act as a separator to separate oil droplets from inlet air and oil droplets from PCV gas. The separated oil accumulates at a bottom of an intake manifold and would reach a critical amount. When the accumulated oil exceeds the critical amount, the oil may ingress a combustion chamber when a driver operates a vehicle at a deep acceleration. The inventors of the present application have recognized that there is need for an intake manifold drain system to drain and recirculate the oil accumulated in the intake manifold.

SUMMARY

According to one aspect of the present disclosure, an intake manifold drain assembly of an engine is provided. The intake manifold drain assembly includes a drain tube connected to a bottom of a manifold chamber; an oil separator connected to an engine block; and a controlled check valve coupled to the drain tube and the oil separator and configured to allow fluid in the manifold chamber to flow into the oil separator and control a flow passing the controlled check valve below a threshold flowrate.

In one embodiment, the drain tube may be connected near or at a lowest location of the manifold chamber.

In another embodiment, the controlled check valve may be positioned at a substantially same height as a connection location of the drain tube to the bottom of the manifold chamber or below a height of a connection location of the drain tube to the bottom of the manifold chamber.

In another embodiment, the controlled check valve may be directly connected to the oil separator.

In another embodiment, the controlled check valve may include a valve seat and a valve diaphragm disposed on the valve seat.

In another embodiment, the valve seat may include a first surface facing an interior and a second surface opposite the first surface. The valve diaphragm may be disposed on the first surface and may be in fluidic communication with gas and liquid in the manifold chamber.

In another embodiment, the valve diaphragm may be made from flexible rubber and may include a connection protrusion extending toward the first surface of the valve seat.

In another embodiment, the valve seat may include an assembling hole to receive the connection protrusion of the valve diaphragm and a flow control aperture.

In another embodiment, the flow control aperture may be configured to control the flowrate below the threshold flowrate.

In another embodiment, the valve seat may be formed on a lateral wall extending from a housing of the oil separator and integrally formed with the housing.

In another embodiment, the intake manifold drain assembly may further comprise a spigot attached to the lateral and encasing the valve seat.

In another embodiment, the spigot is coupled to the drain tube via a connector.

According to another aspect, an intake manifold system of an engine, is provided. The intake manifold system comprises a manifold chamber to receive an inlet gas and a positive crankcase ventilation gas from a crankcase; a drain tube connected to a connection location at a bottom of the manifold chamber, an oil separator connected to a crankcase; and a controlled check valve connecting the drain tube to the oil separator and configured to allow liquid and gas in the manifold chamber to flows into the oil separator and control a gas flow passing the controlled check valve below a threshold flowrate. The connection location is near or at a lowest location of the manifold chamber.

In one embodiment, the oil separator ay be connected to an engine block.

In another embodiment, the oil separator may include a first inlet to receive the fluid from the manifold chamber, and a second inlet to receive the PVC gas in the crankcase.

In another embodiment, the controlled check valve may be positioned at a substantially same height as the connection location or below a height of the connection location.

In another embodiment, the controlled check valve may be directly connected to the oil separator.

In another embodiment, the controlled check valve may be configured to control the threshold flowrate below 15 liters per minute.

In another embodiment, the intake manifold drain assembly may be configured to drain the fluid when the vehicle is not running.

In another embodiment, the controlled check valve may be configured to drain the fluid at a low engine load condition.

In another errrbodiment, the intake manifold system may further comprise a water-cooled charge air cooler disposed in the manifold chamber.

The intake manifold drain assembly of the present application drains the oil droplets accumulated in the intake manifold chamber to prevent the accumulated oil being drawn to the combustion chamber to cause abnormal combustions such as preignition at some conditions. The drained oil passes through an oil separator and eventually collected at an oil sump of the engine. Thus, no additional step is needed to collect the drained oil and the drained oil can be reused. Further, the oil accumulated in the manifold chamber can be continually drained to maintain an oil at a lower level in the manifold chamber.

BRIEF DESCRIPTION OF THE DRAWINGS

Example embodiments will be more clearly understood from the following brief description taken in conjunction with the accompanying drawings. The accompanying drawings represent non-limiting, example embodiments as described herein.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. The use of similar or identical reference numbers in the various drawings is intended to indicate the presence of a similar or identical element or feature.

DETAILED DESCRIPTION

The disclosed intake manifold drain assemblies will become better understood through review of the following detailed description in conjunction with the figures. The detailed description and figures provide merely examples of the various inventions described herein. Those skilled in the art will understand that the disclosed examples may be varied, modified, and altered without departing from the scope of the inventions described herein. Many variations are contemplated for different applications and design considerations; however, for the sake of brevity, each and every contemplated variation is not individually described in the following detailed description.

Throughout the following detailed description, examples of various intake manifold drain assemblies are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

Figure 1:
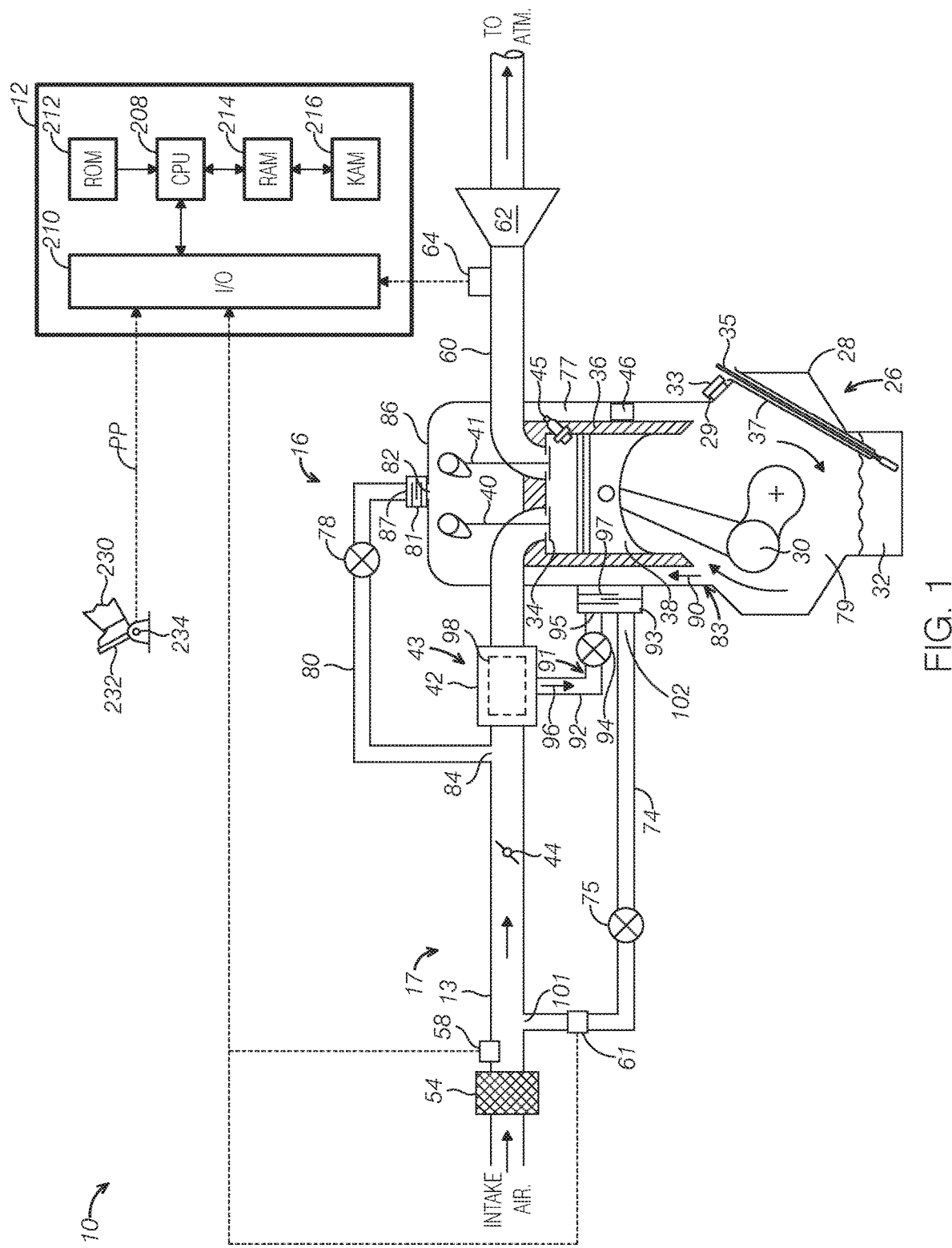
FIG. 1 shows a schematic depiction of an engine and an intake manifold system according to one embodiment of the present disclosure.

Referring to FIG. 1, an example system configuration of a multi-cylinder engine, generally depicted at 10, which may be included in a propulsion system of an automobile, is shown. The engine 10 may be controlled at least partially by a control system including engine controller 12 and by input from a vehicle operator 230 via an input device 232. In this example, the input device 232 includes an accelerator pedal and a pedal position sensor 234 for generating a proportional pedal position signal PP.

The engine 10 may include a lower portion of the engine block, indicated generally at 26, which may include a crankcase 28 encasing a crankshaft 30. The crankcase 28 contains gas and may include an oil sump 32, otherwise referred to as an oil well, holding engine lubricant (e.g., oil) positioned below the crankshaft 30. An oil fill port 29 may be disposed in the crankcase 28 so that oil may be supplied to the oil sump 32. The oil fill port 29 may include an oil cap 33 to seal the oil fill port 29 when the engine is in operation. A dip stick tube 37 may also be disposed in crankcase 28 and may include a dipstick 35 for measuring a level of oil in oil sump 32. In addition, the crankcase 28 may include a plurality of other orifices for servicing components in the crankcase 28. These orifices in crankcase 28 may be maintained dosed during engine operation so that a PCV system (described below) may operate during engine operation.

The upper portion of the engine block 26 may include a combustion chamber. cylinder) 34. The combustion chamber 34 may include combustion chamber walls 36 with a piston 38 positioned therein. The piston 38 may be coupled to the crankshaft 30 so that reciprocating motion of the piston 38 is translated into rotational motion of the crankshaft 30. The combustion chamber 34 may receive fuel from a fuel injector 45 (configured herein as a direct fuel injector) and intake air from an intake manifold 42 which is positioned downstream of a throttle 44. The engine block 26 may also include an engine coolant temperature (ECT) sensor 46 input into an engine controller 12 (described in more detail below herein).

The throttle 44 may be disposed in the engine intake to control the airflow entering intake manifold 42. An air filter 54 may be positioned upstream the throttle 44 and may filter fresh air entering intake passage 13.

In one example, the engine 10 may include a compressor positioned upstream of the throttle 44 and downstream of the air filter 54. In such an example, PCV operation may be modified to account the change of pressure differential in an intake system 17. Specifically, the flow of PCV gases may be reversed. That is to say that crankcase gases may flow through the PCV conduit 74 into the intake passage 13 as opposed to PCV conduit 80. Furthermore, in such an example a turbine 62 may be positioned in the exhaust system. It will be appreciated that the intake system 17 may include the air filter 54, the intake passage 13, the intake manifold 42, the throttle 44, and the intake valve system 40.

The intake air may enter the combustion chamber 34 via a cam-actuated intake valve system 40. Likewise, combusted exhaust gas may exit combustion chamber 34 via a cam-actuated exhaust valve system 41. In an alternate embodiment, one or more of the intake valve system and the exhaust valve system may be electrically actuated.

Exhaust combustion gases exit the combustion chamber 34 via exhaust passage 60 located upstream of a turbine 62. An exhaust gas sensor 64 may be disposed along exhaust passage 60 upstream of the turbine 62. The turbine 62 may be equipped with a wastegate bypassing it. The exhaust gas sensor 64 may be a suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Exhaust gas sensor 64 may be connected with engine controller 12.

In the example of FIG. 1 a positive crankcase ventilation system (PCV) 16 is coupled to the engine intake so that gases in the crankcase 28 may be vented in a controlled manner from the crankcase 28. The PCV system 16 is configured to draw air into the crankcase 28 via a PCV conduit 74 that is coupled to the engine intake (e.g., intake passage 13) so that gasses in the crankcase may be vented in a controlled manner from the crankcase 28 through the PCV conduit 80. A first end 101 of PCV conduit 74 may be mechanically coupled, or connected, to the intake manifold 42 upstream of the throttle 44. Specifically, the PCV conduit 74 may be coupled to the intake passage 13. In some examples, the first end 101 of the PCV conduit 74 may be coupled to the fresh air intake passage 13 downstream of air filter 54 (as shown). In other examples, the PCV conduit 74 may be coupled to the fresh air intake passage 13 upstream of air filter 54. A second end 102, opposite first end 101, of the PCV conduit 74 may be mechanically coupled, or connected, to the oil separator 93. Thus, intake air may flow through the PCV conduit 74 into the crankcase 28 after passing the oil separator during operation of the PCV system 16. A valve 75 may be coupled to the PCV conduit 74 and is configured to regulate the amount of air flowing therethrough. The valve 75 may be controlled via the controller 12 or may be passively operated.

The crankcase gases may include blow-by of combustion gases from the combustion chamber to the crankcase. The blow-by gasses are gasses that flow past the piston in the combustion chamber. The gases that escape into the crankcase 28 may be referred as positive crankcase ventilation (PCV) gases 90. The PCV gases 90 may circulate in the lower region 79 of the crankcase 28 and toward an upper region 77 of the crankcase 28. The PCV gases 90 may exit the crankcase 28 through a crankcase outlet 82 and travel along another PCV conduit 80 to the intake manifold 42.

The PCV conduit 80 includes an inlet 82 and an outlet 84. An oil separator 81 may also be coupled to the PCV conduit 80, The oil separator 81 is configured to remove oil from the crankcase gases 90. The oil separator 81 includes a plurality of baffles 87 or other surfaces which permit flow of PCV gases therethrough while separating oil from the PCV gases exiting crankcase 28.

Likewise, the outlet 84 opens into the intake manifold 42. Thus, the outlet 84 is in fluidic communication with the intake manifold 42 and the cylinders. A PCV valve 78 is coupled to the PCV conduit 80. The PCV valve 78 is configured to regulate the amount of PCV gas flowing through the PCV conduit 80. The PCV valve 78 is a unidirectional check valve or a positive PCV valve which directs flow of PCV gasses in a direction form the crankcase outlet 82 to the intake manifold 42 and restricts backflow of the PCV gases from the crankcase outlet 82 back into the crankcase 28. In this way, crankcase gases may be flowed into the intake system 17.

In some embodiments, PCV conduit 74 may include a pressure sensor 61 coupled therein. Pressure sensor 61 may be an absolute pressure sensor or a gauge sensor. One or more additional pressure and/or flow sensors may be coupled to the PCV system at alternate locations. In some examples, a pressure sensor 58 may be coupled in intake passage 13 downstream of air filter 54 to provide an estimate of the pressure in the intake passage 13.

Gas may flow through the PCV conduit 74 in both directions, from the crankcase 28 towards intake passage 13 and/or from intake passage 13 towards crankcase 28. For example, during non-boosted conditions, the PCV system vents air out of the crankcase and into intake manifold 42 via PCV conduit 80 which, in some examples, may include a one-way PCV valve 78 to provide continual evacuation of gases from inside the crankcase 28 before connection to the intake manifold 42. It will be appreciated that while the depicted example shows PCV valves (75 and/or 78) as a passive valve, this is not meant to be limiting, and in alternate embodiments, PCV valves (75 and/or 78) may be an electronically controlled valve (e.g., a powertrain control module (PCM) controlled valve) wherein a controller may command a signal to change a position of the valve from an open position (or a position of high flow) to a closed position (or a position of low flow), or vice versa, or any position there-between.

In some embodiments, the intake manifold system 43 may include an intake manifold 42 and an intake manifold drain assembly 91. The intake manifold drain assembly 91 is configured to drain fluid 96 in the intake manifold 42. It will be appreciated that, as used herein, the fluid in the intake manifold refers to the fluid 96 passing through the drain tube 92. The fluid 96 may include a flow of a mixture of air and crankcase gases, and liquid which include oil and other liquid such as waterThe intake manifold drain assembly 91 may include a drain tube 92, an oil separator 93 and a controlled check valve 94 coupled to the drain tube 92 and the oil separator 93.

In the depicted embodiment, the oil separator 93 may be mounted to the engine block 83 and include a plurality of baffles 97 or other surfaces which permit flow of the gases therethrough while separating liquid or oil from the gas stream. The oil separator 93 has an inlet 95 to receive the fluid 96 from the intake manifold 42. The controlled check valve 94 is configured to control the flowrate of the fluid 96 under a threshold flowrate. The intake manifold drain assembly 91 will be discussed in greater detail herein with regard to FIGS. 2-6.

In the depicted embodiment, the engine 10 includes two oil separators 82, 93. Alternatively, the engine 10 may include only one oil separator 93 configured to receive both the fluid 96 and the gas in the crankcase 28 to separate the liquid such as the oil from the gas stream. For example, the oil separator 93 may include a second inlet (not shown) to receive the gases in the crankcase 28. The gas exiting the oil separator 93 passes through a check valve, goes through the PCV conduit 80 and then enter the intake manifold 42 while the separated liquid or oil enters the oil sump 32.

In some embodiment, the intake rrranifold system 43 may include a water-cooled charge air cooler (WCAC) 98 disposed inside a manifold chamber. The WCAC 98 may increase the amount of oil presented in the intake manifold 42 because WCAC can separate oil droplets or liquid droplets in the gas stream. The accumulated oil or liquid can be withdrawn from the intake manifold 62 via a controlled manner by the intake manifold drain assembly 91. It will be appreciated that the intake manifold drain system 91 may be used in an engine system without the WCAC.

Engine controller 12 is shown in FIG. 1 as a microcomputer, including microprocessor unit 208, input/output ports 210, an electronic storage medium for executable programs and calibration values shown as read only memory chip 212 in this particular example, random access memory 214, keep alive memory 216, and a data bus. Engine controller 12 may receive various signals from sensors coupled to engine 10, including measurement of inducted mass air flow (MAF) from mass air flow sensor 58; engine coolant temperature (ECT) from temperature sensor 46; exhaust gas air/fuel ratio from exhaust gas sensor 64; etc. Furthermore, the engine controller 12 may monitor and adjust the position of various actuators based on input received from the various sensors. These actuators may include, for example, throttle 44, intake and exhaust valve system 40, 41, PCV valve 75, and/or PCV valve 78. Storage medium read-only memory 212 can he programmed with computer readable data representing instructions executable by microprocessor unit 208 for performing the methods described below, as well as other variants that are anticipated but not specifically listed thereof.

Figure 2:
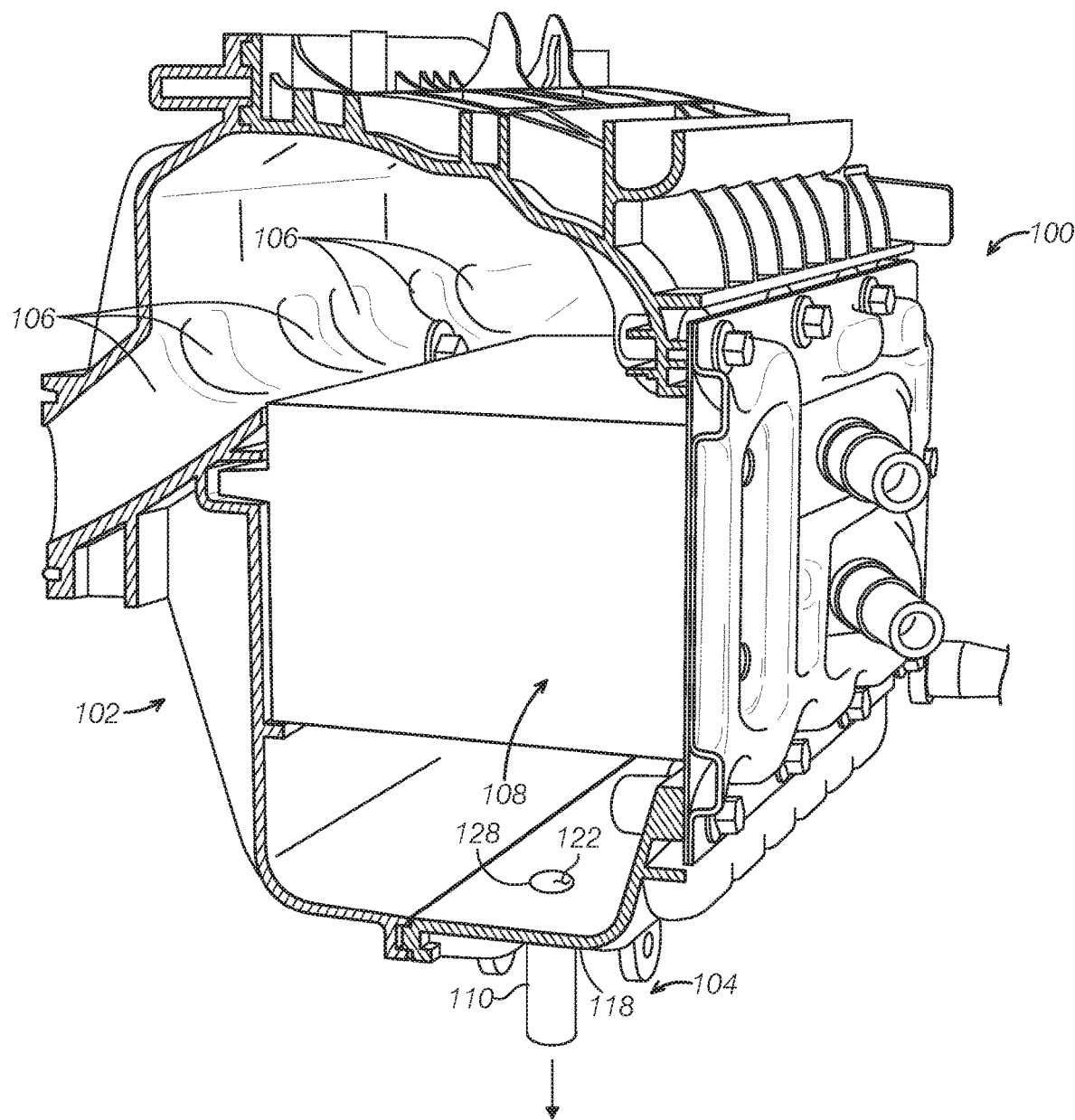
FIG. 2 is a cut-away view of an intake manifold system of an engine according to one embodiment of the present disclosure.
Figure 3:
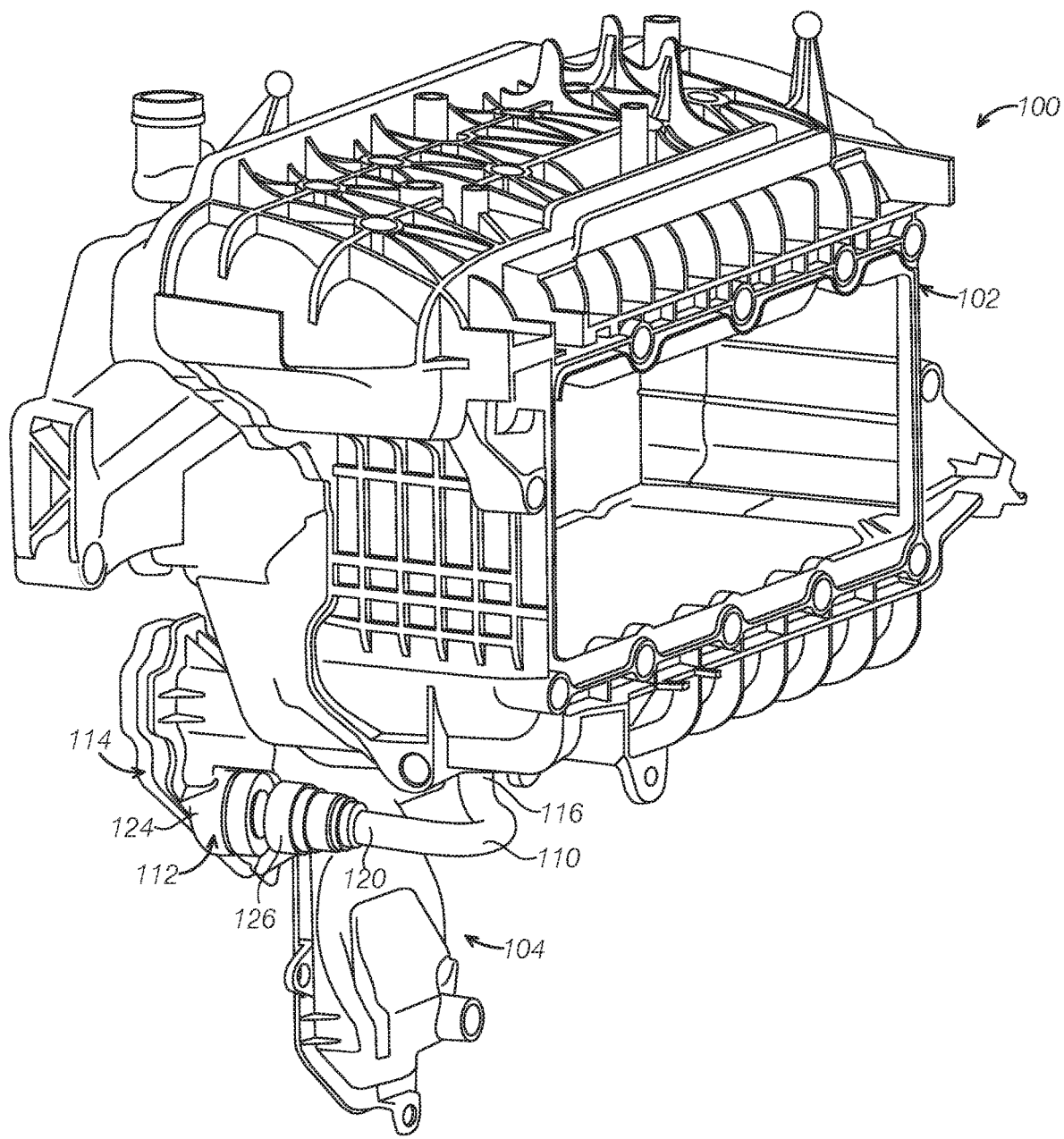
FIG. 3 is another view of the intake manifold system in FIG. 2.
Figure 4:
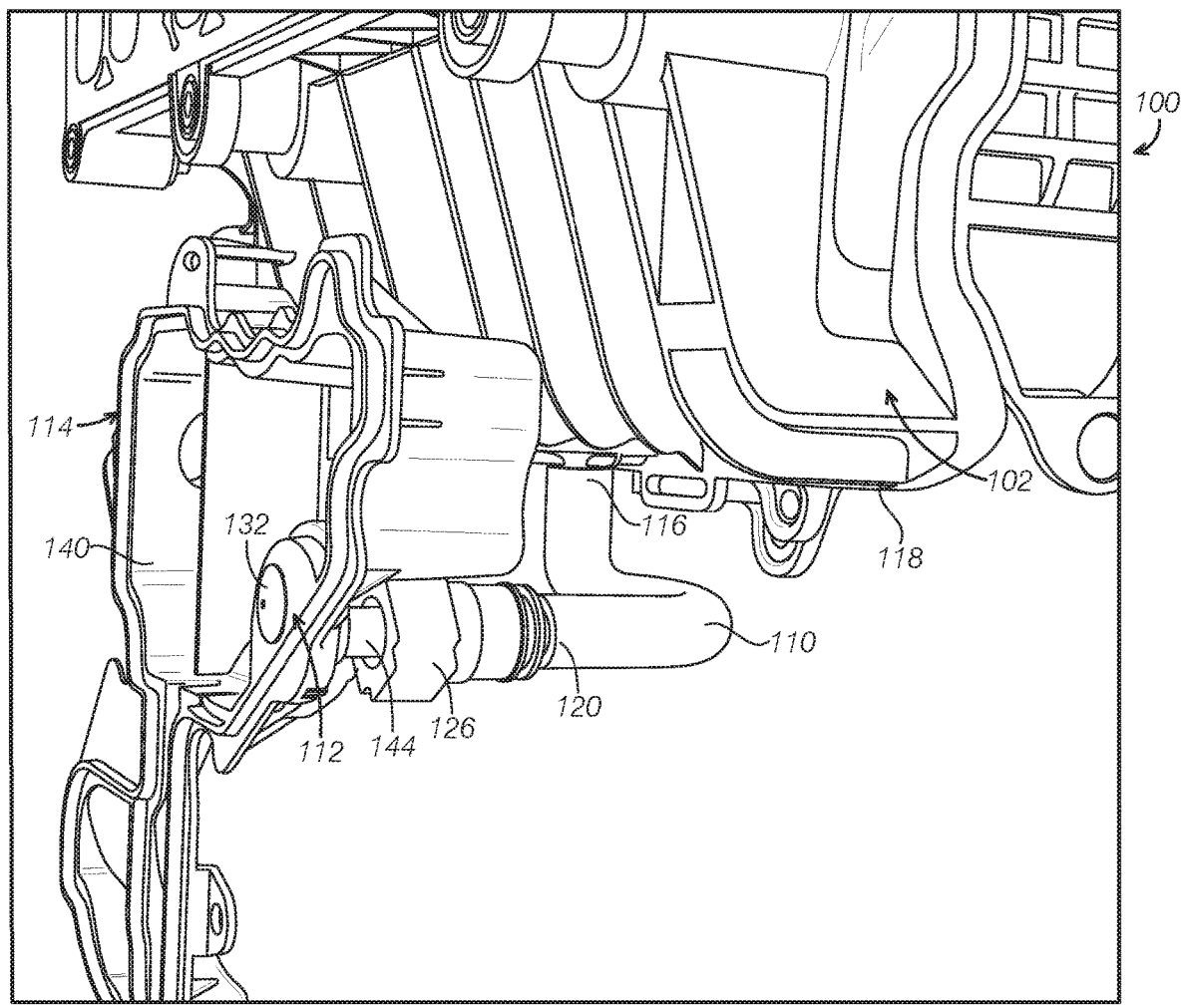
FIG. 4 is a partial view of the intake manifold system in FIG. 2.

Referring to FIGS. 2-4, FIG. 2 is a cut-away view of an intake manifold system of an engine according to one embodiment of the present disclosure. FIG. 3 is one view of an intake manifold system 100 in FIG. 2 and FIG. 4 is another view of the intake manifold system 100 in FIG. 2. The intake manifold system 100 may include a manifold chamber 102 and an intake manifold drain assembly 104. The manifold chamber 102 is configured to receive fresh air and positive crankcase ventilation (PCV) gas. The fresh air and the PCV gas flow into a combustion chamber via runners 106. In some embodiments, the intake manifold system 100 may further include a water-cooled charge air cooler (WCAC) 108 disposed inside the manifold chamber 102. The WCAC 108 may include fins and plates to increase heat exchange surfaces and may be a conventional WCAC used in the art. When the liquid droplets or the oil droplets in the PCV gas pass through the WCAC 108, the liquid droplets are separated from the gas flow and fall into the manifold chamber 102. When the oil is accumulated to a critical amount in the manifold chamber 102, the oil can ingress into a combustion chamber via the runners 106 and causes abnormal combustion at certain conditions. For example, at a high load condition or when a driver press the acceleration pedal, the manifold chamber 102 has a positive pressure. However, a low pressure zone or vacuum may exist at regions adjacent to the runners 106 due to uneven flow distribution in the manifold chamber 102. Thus, the oil may be drawn to the combustion chamber.

In some embodiments, the intake manifold drain assembly 104 or a drain assembly 104 is provided in the intake manifold system 100 to withdraw the oil so as to maintain the accumulated oil under the critical amount. It will be understood that the drain assembly 104 may be used in an engine system without a WCAC. The drain assembly 104 may include a drain tube 110, a controlled check valve 112 and an oil separator 114. The drain tube 110 may have a first end 116 connected to a bottom 118 of the manifold chamber 102 and a second end 120 coupled to the controlled check valve 112. In some embodiments, the drain tube 110 may be connected to a hole 122 near or at a lowest location of the bottom 118 of the manifold chamber 102 such that the liquid droplets can be drained to the drain tube 110 by gravity. The drain tube 110 is in fluidic communication via the hole 122. The drain tube 110 may be made from material resistant to oil corrosion such as metal or plastic material (e.g., Nylon 612). The drain tube 110 may be connected to the bottom 118 of the manifold chamber 102 by welding or screw/nut connection or any appropriate approaches.

In some embodiments, the oil separator 114 may be theoil separator specifically designed for the drain assembly 104. The oil separator 114 may have one inlet 124 to receive the intake manifold flow and one outlet to be fluidic communicated with a crankcase or an oil sump. The oil separator 114 may be mounted on an engine block. Alternatively, the oil separator may be configured to remove the liquid or oil from the gas in the crankcase before the crankcase gas enters the manifold chamber 102 in addition to treat the intake manifold flow. In this embodiment, the oil separator may have a first inlet 124 to receive the fluid in the intake manifold chamber 102, a second outlet lot shown), a second inlet to receive gas in the crankcase, and an outlet to exit the gas and separated liquid or oil.

The controlled check valve 112 may be positioned below a connection location 128 of the drain tube 110 to the manifold chamber 102 such that the accumulated oil tends to flow into the check valve by the gravity. The controlled check valve 112 is configured to allow the gas/liquid to flow in one direction to the oil separator 114 and control a flowrate under a threshold flowrate. The threshold flow varies depending on the engine architecture and the PCV system design. In one example, the controlled check valve 112 may be configured to control a flowrate less than 15 liters per minute during a high load condition. The high load condition may refer to a condition when the manifold chamber 102 has a positive pressure or when a vehicle is accelerating. With controlled flowrate, the oil separator 114 can operate normally. In the depicted embodiment, the controlled check valve 112 is connected to the drain tube 110 via a quick connector 126.

Figure 5:
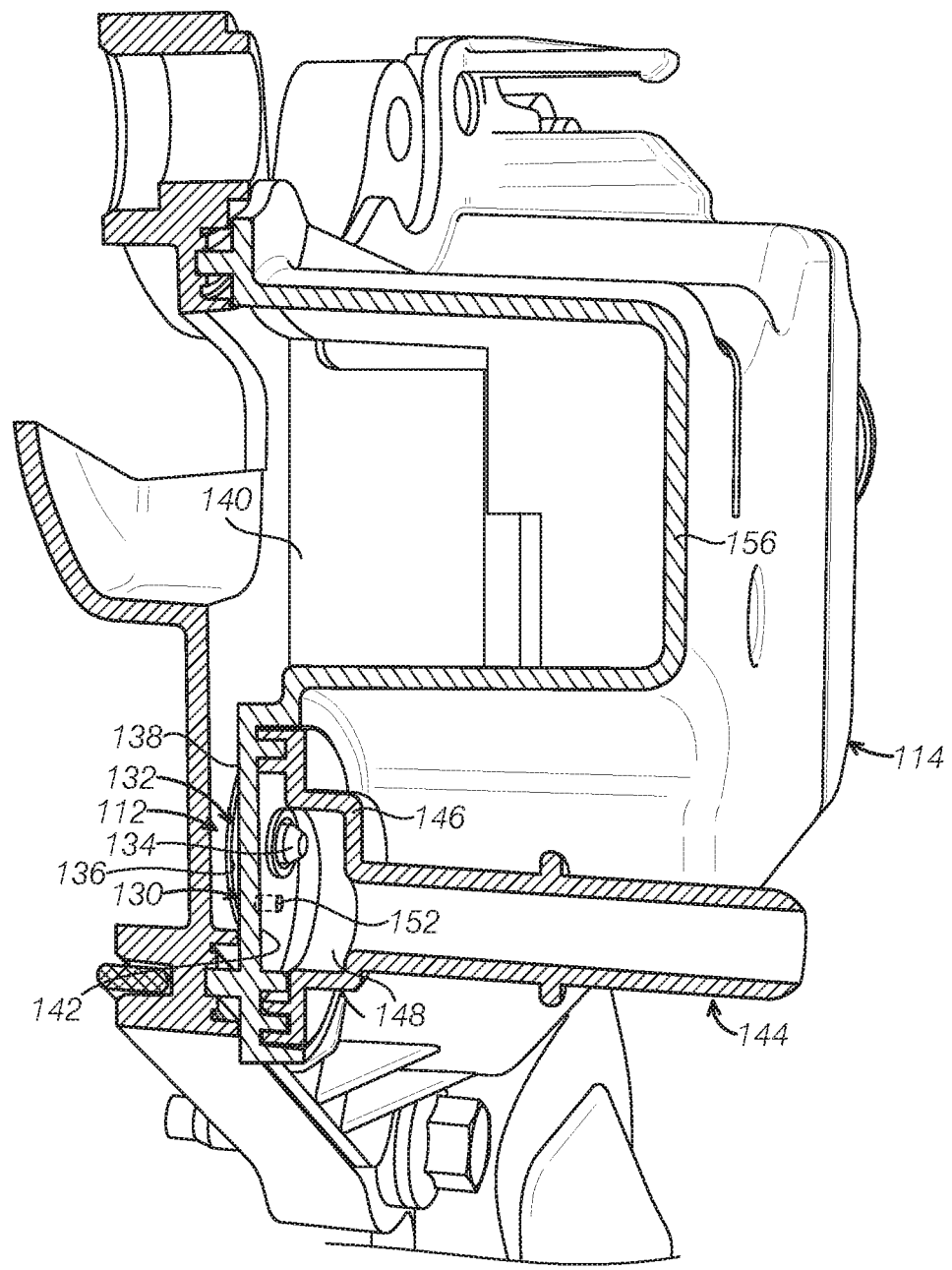
FIG. 5 is a partial view of an intake manifold drain assembly of the intake manifold system in FIG. 2.

Referring to FIGS. 4-5, FIG. 4 shows partial views of the oil separator 114, the intake manifold system 100 and the controlled check valve 112 connected to the oil separator 114. FIG. 5 is a cross-sectional of the oil separator 114 and the controlled check valve 112, illustrating the configuration of the controlled check valve 112. In some embodiments, the controlled check valve 112 may include a valve seat 130 and a valve diaphragm 132 disposed the valve seat 130. In some embodiments, the valve diaphragm 132 may be an annular shape plate and include a connection protrusion 134 extending from an inner surface 136 of the valve diaphragm 132 and facing the valve seat 130. The inner surface 136 is the surface of the valve diaphragm 132 that faces the valve seat 130. The valve diaphragm 132 may be made from flexible rubber. In the depicted embodiment, the valve diaphragm 132 sits on a first surface 138 of the valve seat 130 which faces an interior 140 of the oil separator 114 or is in fluidic communication with the oil separator 114. In other words, the valve diaphragm132 is disposed in a downstream side. The pressure inside the oil separator 114 defines a downstream pressure of the controlled check valve 112.

The valve seat 130 has a second surface 142 opposite the first surface 138. A spigot 144 is attached to the second surface 142 of the valve seat 130. The spigot 144 has an enlarged portion 146 which form a housing 148 together with the second surface 142. The spigot 144 is coupled to the drain tube 110 via a connector 126. The pressure inside the manifold chamber 102 defines an upstream pressure of the controlled check valve 112. When the upstream pressure exceeds the downstream pressure, the valve diaphragm 132 is pushed away from the valve seat 130 to allow the gas flow into the oil separator 114.

Figure 6:
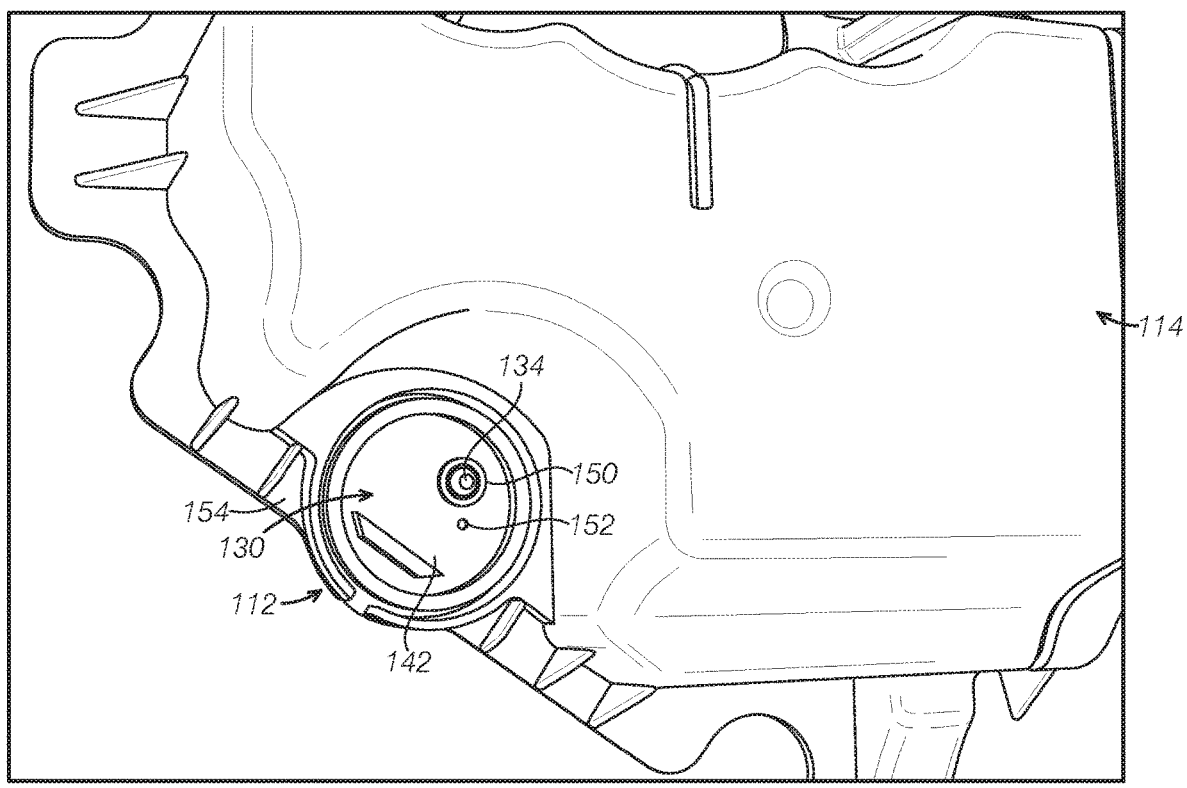
FIG. 6 is a partial view of an oil separator of the intake manifold system n FIG. 2.

The controlled check valve 112 is configured to maintain the flowrate below a threshold flowrate regardless of the upstream pressure. Referring to FIG. 6, a partial plan view of the oil separator 114 is shown to illustrate the valve seat 130 of the controlled check valve 112. The valve seat 130 may include an assembling hole 150 and a flow control aperture 152. With further reference to FIG. 5, the valve diaphragm 132 includes a connection protrusion 134 inserted into the assembling hole 150 such that the valve diaphragm 132 is attached to the valve seat 130 while allowing certain movement when the pressure differential exceeds a threshold pressure. The flow control aperture 152 is configured to keep the flowrate under a threshold flowrate. In the depicted embodiment, the flow control aperture 152 is an annular hole. The flow control aperture 152 controls the flowrate via regulating the resistant to the flow. The dimension, shape and location of the flow control aperture 152 vary depending on an engine architecture and a PCV system design such that the flow rate through the flow control aperture 152 or a metered back flow can be controlled under a desired threshold flowrate. The threshold flowrate depends on the engine architecture and the PCV system design. In some embodiments, the flow control aperture 152 may have a diameter in a range of about 0.8-1.5 millimeters. In one example engine the flow control aperture 152 may have a diameter of about 1.2 millimeters and the flowrate of the controlled check valve 112 can be controlled under about 15 liters per minute when a load in the manifold chamber 102 at one barometric pressure or one atmospheric pressure above the atmosphere pressure. The flowrate refers to the flowrate of the fluid from the intake manifold including gas and liquid. It should be understood that the flow control aperture may have any appropriate configurations such as an elongated slot and positioned at any a.ppropriated locations on the valve seat.

In some embodiments, the valve seat 130 may be formed on a lateral wall 154 of the oil separator 114 as shown in FIGS. 4-5. The lateral wall 154 may extends from a housing 156 of the oil separator 114. The valve seat 130 may be integrally formed with a housing 156.

In some embodiments, the controlled check valve 112 installed in the intake manifold system or the intake manifold drain assembly 104 may be configured to allow fluid to pass through at a low engine load condition or when the vehicle is not running, or the vehicle is key off. At a low engine load condition or the vehicle key off condition, the pressure differential between the connection location of the drain tube 110 and the downstream side of the controlled check valve 112 can be created by gravity, which may contribute to opening of the controlled check valve 112.

The intake manifold system of the present application drains and recirculates the oil droplets accumulated in the intake manifold to an oil separator. In this way, no additional step is needed to collect the drained oil and the drained oil can be reused. Further, the oil accumulated in the manifold chamber can be continually drained to maintain an oil at a lower level in the manifold chamber.

The disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel and non-obvious combinations and subcombinations of the various elements, features, functions and/or properties disclosed above and inherent to those skilled in the art pertaining to such inventions.

The following claims particularly point out certain combinations and subcombinations regarded as novel and non-obvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application.

The invention claimed is:

1. An intake manifold drain assembly of an engine, comprising:
    a drain tube connected to a bottom of a manifold chamber;
    an oil separator connected to an engine block; and
    a controlled check valve coupled to the drain tube and the oil separator and configured to allow fluid in the manifold chamber to flow into the oil separator and control a flow passing the controlled check valve below a threshold flowrate.

2. The intake manifold drain assembly of claim 1, wherein the drain tube is connected near or at a lowest location of the manifold chamber.

3. The intake manifold drain assembly of claim 1, wherein the controlled check valve is positioned at a substantially same height as a connection location of the drain tube to the bottom of the manifold chamber or below a height of a connection location of the drain tube to the bottom of the manifold chamber.

4. The intake manifold drain assembly of claim 1, the controlled check valve is directly connected to the oil separator.

5. The intake manifold drain assembly of claim 4, wherein the controlled check valve includes a valve seat, and a valve diaphragm disposed on the valve seat.

6. The intake manifold drain assembly of claim 5, wherein the valve seat includes a first surface facing an interior and a second surface opposite the first surface, wherein the valve diaphragm is disposed on the first surface and is in fluidic communication with the fluid in the manifold chamber.

7. The intake manifold drain assembly of claim 6, wherein the valve diaphragm is made from flexible rubber and includes a connection protrusion extending toward the first surface of the valve seat.

8. The intake manifold drain assembly of claim 7, wherein the valve seat includes an assembling hole to receive the connection protrusion of the valve diaphragm and a flow control aperture.

9. The intake manifold drain assembly of claim 8, wherein the flow control aperture is configured to control the flowrate below the threshold flowrate.

10. The intake manifold drain assembly of claim 1, wherein the valve seat is formed on a lateral wall extending from a housing of the oil separator.

11. The intake manifold drain assembly of claim 5, further comprising a spigot attached to the lateral wall and encasing the valve seat.

12. The intake manifold drain assembly of claim 11, wherein the spigot is coupled to the drain tube via a connector.

13. An intake manifold system of an engine in a vehicle, comprising:
    a manifold chamber to receive an inlet gas and a positive crankcase ventilation gas (PCV) from a crankcase:
    an intake manifold drain assembly including:
        a drain tube connected to a connection location at a bottom of the manifold chamber, wherein the connection location is near or at a lowest location of the manifold chamber;
        an oil separator connected to an engine block; and
        a controlled check valve coupled to the drain tube and the oil separator and configured to allow fluid in the manifold chamber to flow into the oil separator and control a flow passing the controlled check valve below a threshold flowrate.

14. The intake manifold system of claim 13, wherein the oil separator is connected to a crankcase at a lower portion of the engine block.

15. The intake manifold system of claim 14, wherein the oil separator includes a first inlet to receive fluid from the manifold chamber, a second inlet to receive the fluid in the crankcase.

16. The intake manifold system of claim 13, wherein the controlled check valve is positioned at a substantially same height as the connection location or below a height of the connection location.

17. The intake manifold system of claim 13, the controlled check valve is directly connected to the oil separator.

18. The intake manifold system of claim 17, wherein the intake manifold drain assembly is configured to drain the fluid when the vehicle is not running.

19. The intake manifold system of claim 17, wherein the intake manifold drain assembly is configured to drain the fluid at a low engine load condition.

20. The intake manifold system of claim 13, further comprising a water-cooled charge air cooler disposed in the manifold chamber.

* * * * *